(12) United States Patent
Hernandez

(10) Patent No.: US 11,981,172 B2
(45) Date of Patent: May 14, 2024

(54) TOW HITCH CONNECTOR COVER SYSTEM

(71) Applicant: Toyota Motor Engineering & Manufacturing North America, Inc., Plano, TX (US)

(72) Inventor: Jose Hernan Hernandez, Ypsilanti, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 740 days.

(21) Appl. No.: 17/132,212

(22) Filed: Dec. 23, 2020

(65) Prior Publication Data

US 2022/0194151 A1 Jun. 23, 2022

(51) Int. Cl.
*B60D 1/60* (2006.01)
*E05F 1/10* (2006.01)
*E05F 15/627* (2015.01)

(52) U.S. Cl.
CPC .............. *B60D 1/60* (2013.01); *E05F 1/1008* (2013.01); *E05F 15/627* (2015.01); *E05Y 2201/434* (2013.01); *E05Y 2201/624* (2013.01); *E05Y 2201/656* (2013.01); *E05Y 2201/71* (2013.01); *E05Y 2900/53* (2013.01)

(58) Field of Classification Search
CPC ........ B60D 1/60; E05F 15/627; E05F 1/1008; E05Y 2201/624; E05Y 2201/656; E05Y 2201/71; E05Y 2900/53
See application file for complete search history.

(56) References Cited

U.S. PATENT DOCUMENTS

| | | | |
|---|---|---|---|
| 6,019,386 A * | 2/2000 | Morelock | B60D 1/64 280/422 |
| 6,149,181 A * | 11/2000 | Biederman | B60D 1/60 280/491.1 |
| 6,260,874 B1 * | 7/2001 | Smith | B60D 1/60 D12/162 |
| 6,719,318 B1 * | 4/2004 | Blake | B60D 1/60 280/507 |
| 6,874,806 B1 * | 4/2005 | Blake | B60D 1/605 280/507 |
| 6,908,096 B2 * | 6/2005 | Lewis | B60D 1/60 280/507 |
| 6,971,663 B1 * | 12/2005 | Blake | B60D 1/60 280/155 |
| 9,555,677 B1 * | 1/2017 | Merino Almeida | B60D 1/60 |
| 2002/0125686 A1 * | 9/2002 | Blake | B60D 1/065 280/507 |

(Continued)

FOREIGN PATENT DOCUMENTS

DE 202016106386 U1 * 3/2017 .............. B60D 1/54

*Primary Examiner* — Jacob D Knutson
(74) *Attorney, Agent, or Firm* — Christopher G. Darrow; Darrow Mustafa PC

(57) ABSTRACT

A cover system for covering a vehicle tow hitch connector includes at least a first retention member including a first retention slot, and a first door support coupled to the first retention member. A second door support is positioned opposite the first door support. A door is rotatably coupled to the first and second door supports. The door includes a first retention projection structured to be received in the first retention slot to position the door in a closed orientation.

14 Claims, 10 Drawing Sheets

(56) References Cited

U.S. PATENT DOCUMENTS

2004/0232653 A1\* 11/2004 Kaepp ................... B60D 1/56
                                                                                    280/500
2005/0199021 A1\* 9/2005 Freeman ............... E05B 37/025
                                                                                     70/63

\* cited by examiner

TOW HITCH CONNECTOR COVER SYSTEM

TECHNICAL FIELD

The present invention relates to mechanisms for covering portions of a vehicle and, more particularly, to a mechanism including a door designed to be closable to cover a vehicle tow hitch connector when the connector is not in use, and openable to enable access to the connector for towing applications.

BACKGROUND

Vehicles may mount tow hitch connectors to enable the vehicle to tow trailers. Such tow hitch connectors may be formed from hollow tubing sections. When not in use and exposed to the elements, mud, ice, and other foreign objects may become lodged inside the tow hitch connector and/or collect on the outside of the connector, possibly interfering with its use when desired. In addition, to accommodate the tow hitch connector in existing vehicle designs, the rear bumper fascia and the tow hitch mounting location need to be configured so that the tow hitch resides at a predetermined minimum height above the ground surface and also below a lowest portion of the fascia. These requirements may restrict vehicle and component design flexibility.

SUMMARY

In one aspect of the embodiments described herein, a cover system for covering a vehicle tow hitch connector is provided. The system includes at least a first retention member including a first retention slot, and a first door support coupled to the first retention member. A second door support is positioned opposite the first door support. A door is rotatably coupled to the first and second door supports. The door includes a first retention projection structured to be received in the first retention slot to position the door in a closed orientation.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. Also, unless otherwise stated or shown, the same or similar elements shown in different views may be given the same or similar reference numerals or designations.

DETAILED DESCRIPTION

Figure 1A:
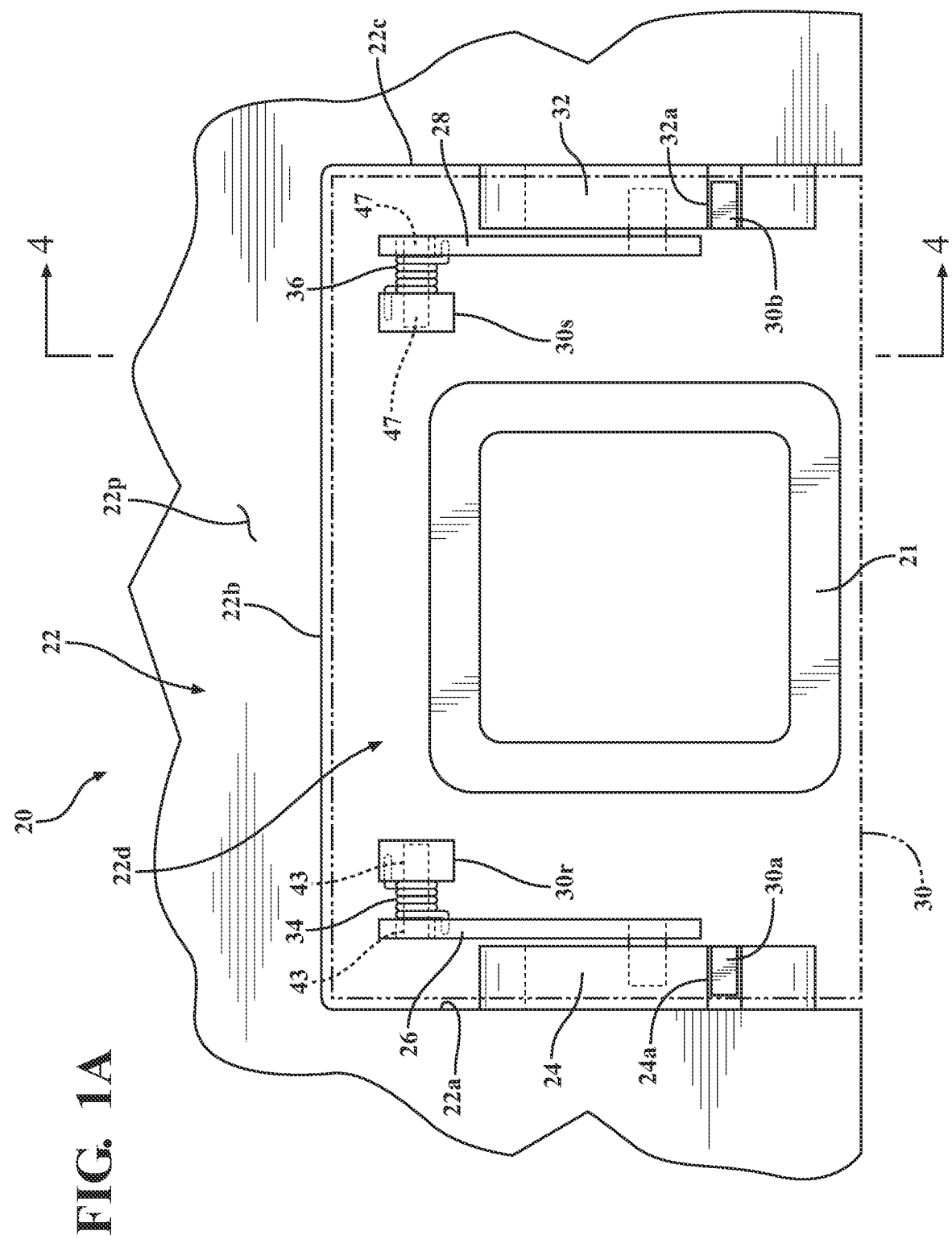
FIG. 1A is a schematic end view of a cover system for covering a vehicle tow hitch connector in accordance with an embodiment described herein and showing a door of the cover system in a closed orientation.

A cover system for covering a vehicle tow hitch connector includes a door designed to be closable to cover the tow hitch connector when the connector is not in use, and openable to enable access to the connector for towing applications. In one embodiment, the door may be opened and closed manually. In another embodiment, the system may be motorized to enable opening and closing of the door without manual actuation. A cavity may be formed in the design of a rear bumper fascia to enable the tow hitch connector to extend into the existing space envelope of the fascia. This may enable the tow hitch connector to be mounted relatively higher on the vehicle so as to extend into the fascia cavity. Depending on a particular vehicle design, this may permit the overall vehicle profile to be lowered to some degree while still maintaining a required ground clearance and enabling attachment of a tow hitch connector to the vehicle.

FIGS. 1A-4 show a first embodiment of a cover system (generally designated 20) for covering a vehicle tow hitch connector 21. In one or more arrangements, an embodiment of the cover system described herein may be mounted on a vehicle rear bumper (not shown). In other arrangements, an embodiment of the system may be installed in a bumper fascia 22 designed to be mounted on and cover a portion of a vehicle bumper. The embodiments described herein are shown installed in a bumper fascia 22. Components of the cover system may be formed from any materials suitable for their respective applications, as described herein.

Referring to the drawings, bumper fascia 22 may be structured to mountable on a vehicle rear bumper (not shown). The bumper fascia 22 may include a plurality of walls 22a, 22b, 22c defining a cavity 22d. The plurality of walls may be structured for enclosing a portion of a tow hitch connector 21 extending into the cavity 22d when the fascia 22 is mounted on the bumper.

To accommodate the cover system described herein, the cavity 22d may be formed in the design of a rear bumper fascia 22 to enable the tow hitch connector 21 to extend into the existing space envelope of the fascia. In previous designs, it was necessary to configure the bumper fascia and the tow hitch mounting location so that the tow hitch would reside at a predetermined minimum height above the ground surface and also below a lowest portion of the fascia. In the cover system embodiments described herein, the tow hitch connector 21 may be mounted relatively higher on the vehicle so as to extend into the fascia cavity 22d. Depending on a particular vehicle design, this may permit the overall vehicle profile to be lowered to some degree while still maintaining a required ground clearance and enabling attachment of a tow hitch connector to the vehicle. As seen in the drawings, the fascia cavity 22d may extend into the fascia from a lowermost edge 22m of the fascia.

In one or more arrangements, the cover system 20 may include a first retention member 24 including a first retention slot 24a. The first retention member 24 may be attached to a first sidewall 22a of the fascia cavity 22d.

A first door support 26 may be coupled to the first retention member 24. Components described herein as being "coupled" to each other may be connected either directly (e.g., by direct physical contact) or indirectly (through one or more parts interposed between the components). The first door support 26 may be a part formed separately from the first retention member 24 and later attached to the first retention member. In certain arrangements, the first door support 26 may be rotatably coupled to the first retention member 24.

A second door support 28 may be positioned opposite the first door support 26. The structure and position of the second door support 28 may be selected so that the door 30 is supported by the first and second door supports 26, 28 in a manner enabling opening and closing of the door 30 as described herein.

The cover system 20 may also include a second retention member 32. The second retention member 32 may be attached to the second sidewall 22c and the second door support 28 may be coupled to (or formed integrally with) the second retention member 32. In certain arrangements, the second door support 28 may be rotatably coupled to the second retention member 32. The second retention member 32 may include a first retention slot 32a.

In one or more other arrangements, the second retention member 32 may be omitted and the second door support 28 may be directly attached to a second sidewall 22c of the fascia cavity 22d.

A door 30 (shown in phantom in a closed orientation in FIG. 1A) may be rotatably coupled to the first and second door supports 26, 28. Referring to FIGS. 1A-4, the door 30 may include a first retention projection 30a structured to be received in the first retention slot 24a to position and secure the door 30 in a closed orientation. In cover system embodiments including a second retention member 32 having a respective first retention slot 32a, the door 30 may include a second retention projection 30b structured to be received in the second retention member first retention slot 32a when the door 30 is in the closed orientation.

In one or more arrangements, the cover system may be manually operated. In other arrangements, the cover system may be motorized so that the door is opened and closed without manual manipulation of the door. Opening of the door exposes and enables access to the tow hitch connector residing in the fascia cavity 22d. In the description, elements common to both the manual and motorized versions may be denoted by the same or similar reference characters.

FIGS. 1A-4 show an embodiment of a manually operable cover system. In the embodiment shown, the first retention member 24 may be attached to the first sidewall 22a of the fascia cavity 22d, and the second retention member 32 may be attached to the second sidewall 22c of the fascia cavity 22d. In addition to the first and second retention member first retention slots 24a, 32a, first retention member 24 may also include a second retention slot 24b angularly spaced apart from its first retention slot 24a, and second retention member 32 may include a second retention slot 32b angularly spaced apart from its first retention slot 32a. The first door support 26 may be rotatably coupled to the first retention member 24 and the second door support 28 may be rotatably coupled to the second retention member 32.

The door 30 may include bosses 30r, 30s or other features to enable suitable mounting pins or bearings to be mounted thereon for rotatably coupling the door 30 to the door supports 26, 28. Similarly, ends of the door supports 26, 28 may include features enabling suitable mounting pins or bearings to be mounted thereon for rotatably coupling the door 30 to the door supports 26, 28.

A first spring member 34 may be operably coupled to the door 30 and to the first door support 26. The first spring member 34 may be structured to operate on the door 30 and first door support 26 so as to rotate the door 30 with respect to the first door support 26 and bias the first retention projection 30a in a direction toward the first retention member first retention slot 24a. When a portion of the first retention projection 30a is received in the first retention member first retention slot 24a, the door 30 is secured in the closed orientation.

Similarly, a second spring member 36 may be operably coupled to the door 30 and to the second door support 28. The second spring member 36 may be structured to operate on the door 30 and second door support 28 so as to rotate the door 30 with respect to the second door support 28 and bias second retention projection 30b in a direction toward the second retention member first retention slot 32a. When a portion of the second retention projection 30b is received in the second retention member first retention slot 32a, the door 30 is secured in the closed orientation.

Figure 8:
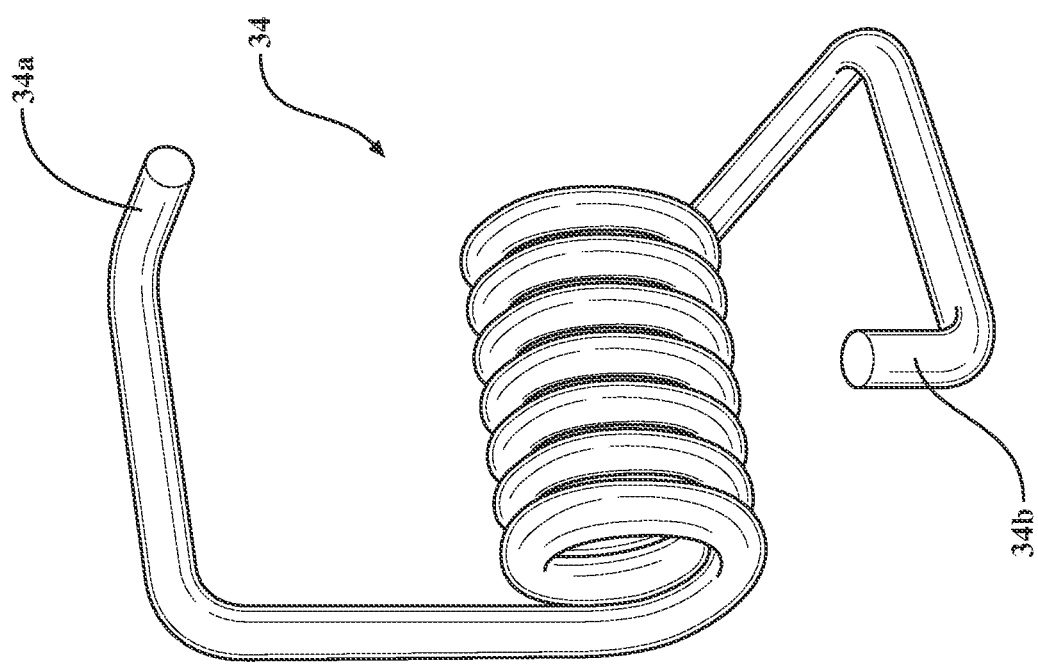
FIG. 8 is a schematic perspective view of an exemplary spring usable for biasing rotation of a cover system door, in accordance with embodiments described herein.

In particular embodiments, the first and second spring members 34, 36 may have a coil configuration according to the example shown in FIG. 8, with one free end 34a of the spring contacting the door 30 and an opposite free end 34b of the spring contacting the closest door support, whereby relative rotational forces may be exerted on the door supports 26, 28 and door 30.

Figure 1B:
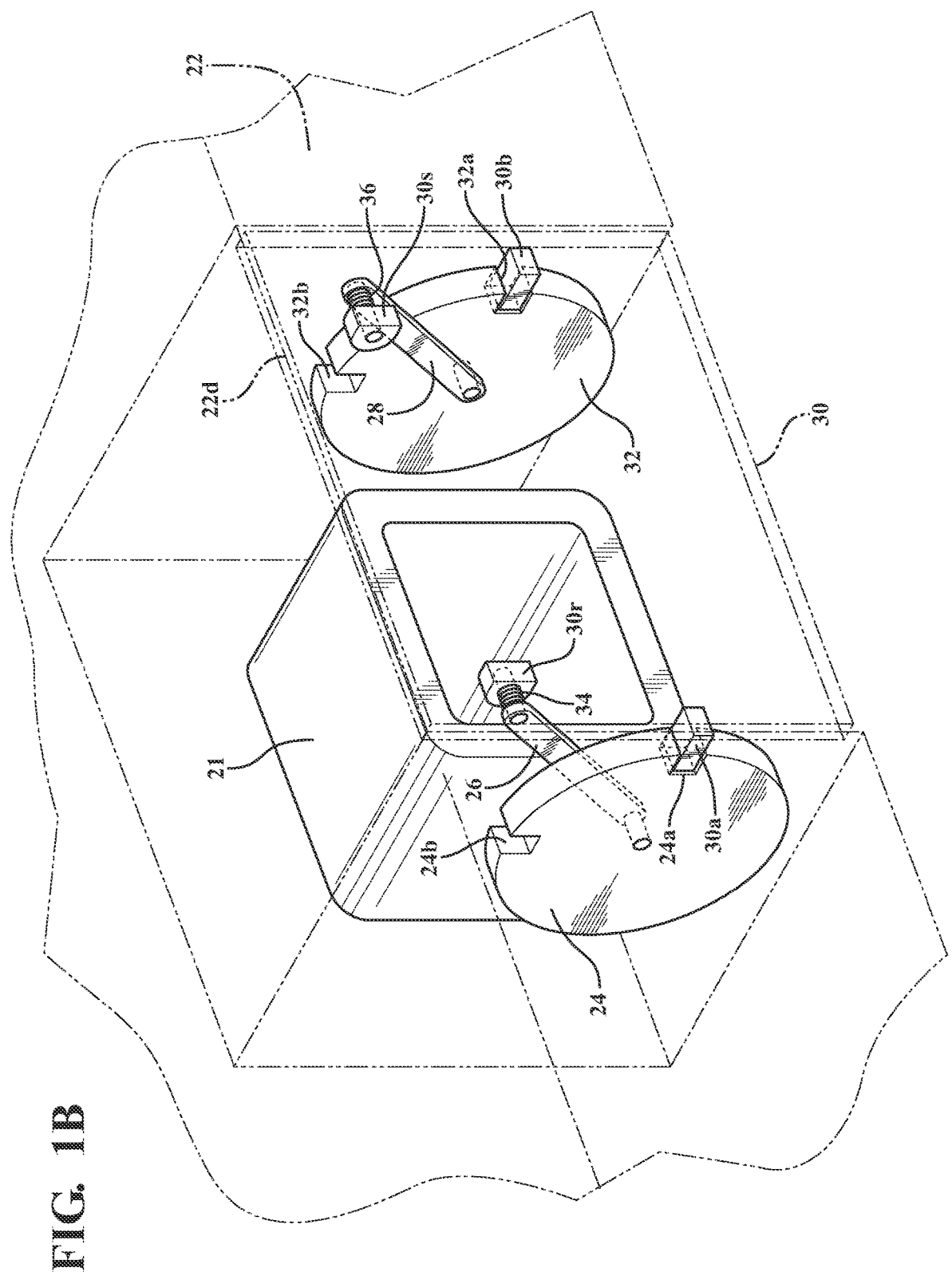
FIG. 1B is a schematic perspective view of the cover system shown in FIG. 1A, also showing the door in the closed orientation.
Figure 2:
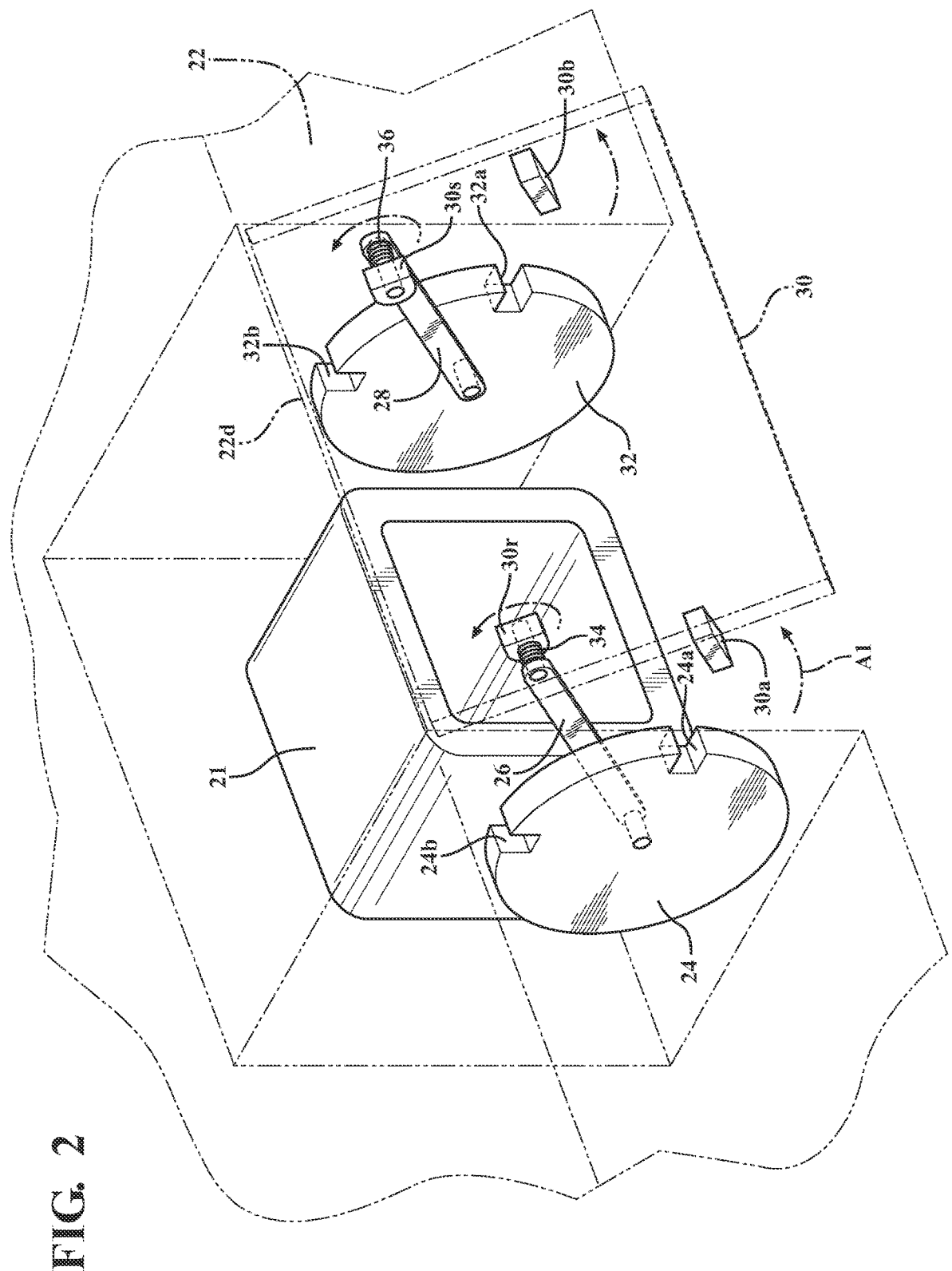
FIG. 2 is the schematic perspective view of FIG. 1B showing an initial stage of manually opening the door.
Figure 4:
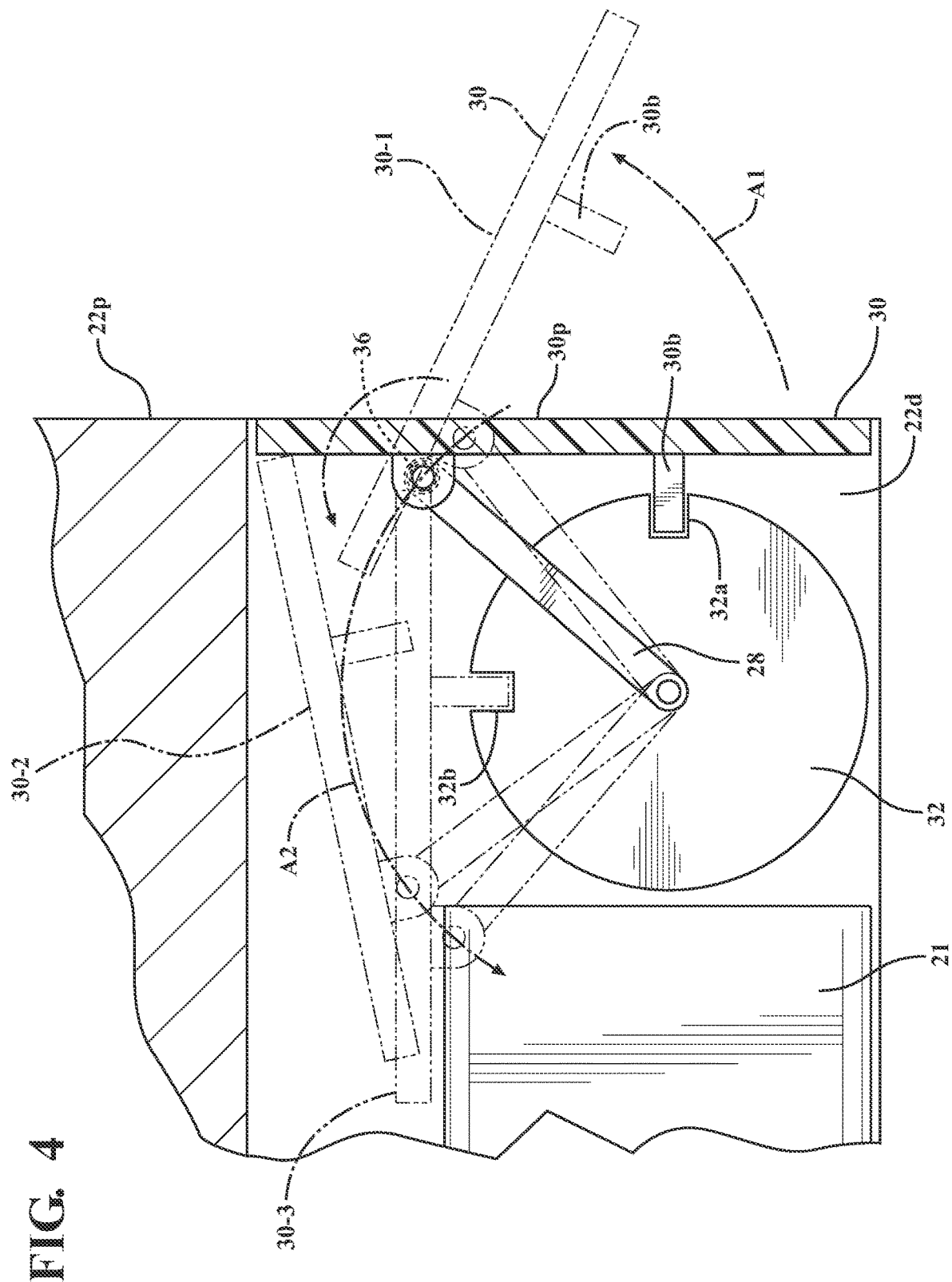
FIG. 4 is a schematic side view of the cover system shown in FIGS. 1A-3 showing (in solid lines) the door in the closed orientation and also showing a progression of orientations (in phantom lines) of the door as the door is manually moved from the closed orientation of FIGS. 1A-1B to the open orientation shown in FIG. 3.

Referring to FIG. 4, in embodiments described herein, the door 30 may be structured and coupled to the fascia 22 so that an outer surface 30p of the door 30 is flush with an outer surface 22p of the fascia 22 adjacent the cavity 22d when the door is in the closed orientation as shown in FIGS. 1A-1B and 4. In addition, the door 30 may be structured and mounted so as to cover almost the entire open side of the fascia cavity 22d when the door 30 is closed.

FIGS. 1A and 1B show the door 30 in a closed position, with the door 30 shown in phantom in FIG. 1A. FIG. 4 shows the door closed (in solid lines) and also shows (in phantom) a progression of orientations of the door 30 as the door is manually opened from the closed orientation. The first and second spring member biasing of the door 30 maintains the retention projections 30a, 30b in the first retention member first retention slot 24a and the second retention member first retention slot 32a, respectively, until the door 30 is rotated to remove the first and second retention projections 30a, 30b from their respective retention slots.

Figure 3:
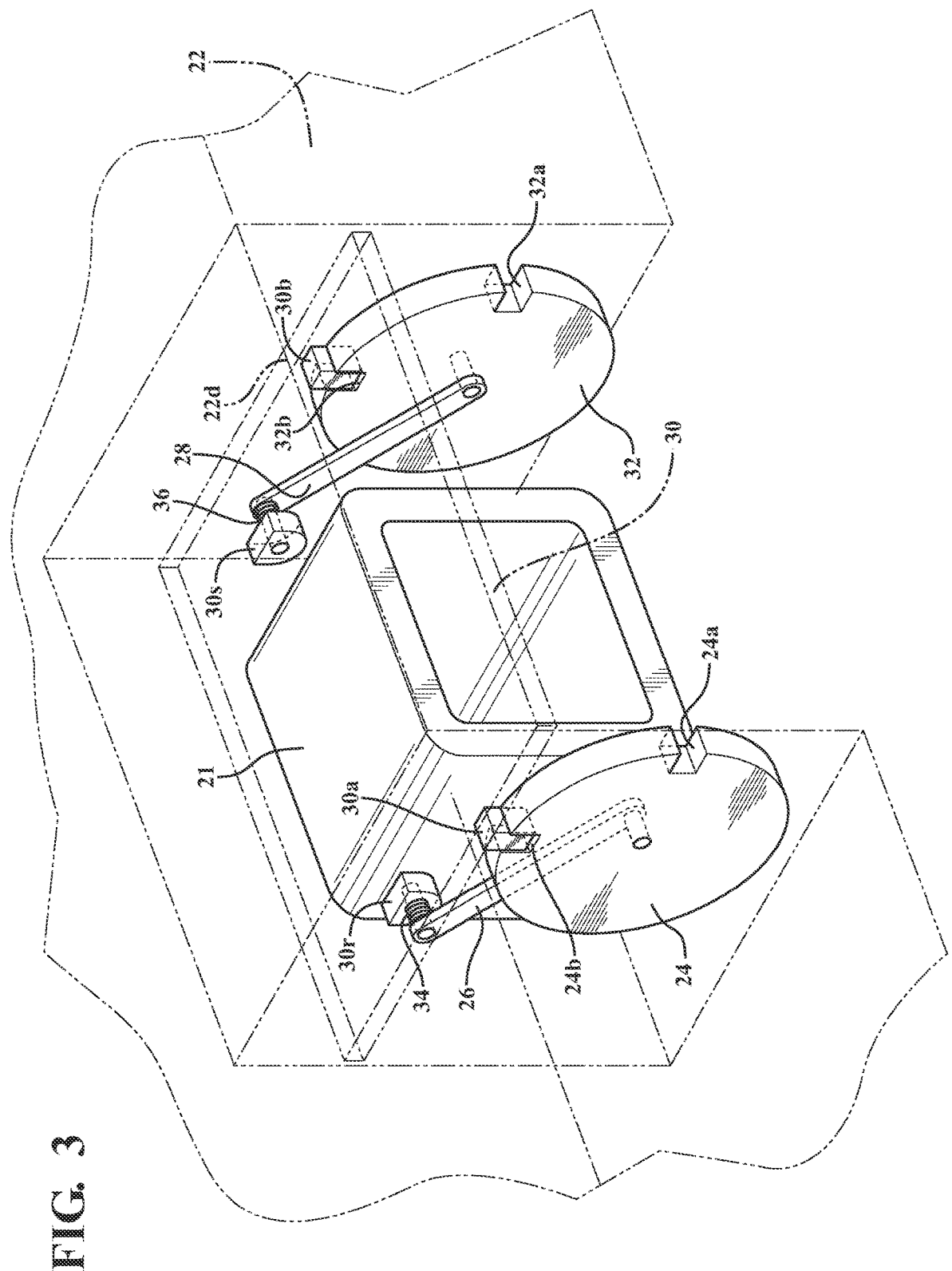
FIG. 3 is the schematic perspective view of FIG. 1B showing the door completely opened and secured in the open orientation.

Referring to FIGS. 1A-4, to raise the door 30, a lower end of the door may pulled away from the retention members 24, 32 in direction A1 against the forces of the springs 34, 36 (FIG. 2), thereby removing retention projections 30a, 30b from the retention slots 24a, 32a. This permits the door supports 26, 28 to be rotated in direction A2 with respect to the retention members 24, 32 (FIG. 4, condition 30-1). The door supports 26, 28 and the door 30 are rotated to insert the door into the fascia cavity 22d above the tow hitch connector 21 as shown in FIGS. 3 and 4 (condition 30-2), until the first and second retention projections 30a, 30b reside over the second retention slots 24b, 32b of the first and second retention members 24, 32. The door 30 may then be locked in the open position by aligning the retention projections 30a, 30b with the second retention slots 24b, 32b, then allowing the spring forces to snap the retention projections 30a, 30b into their respective second retention slots 24b, 32b (FIG. 3 and condition 30-3 of FIG. 4) and retain the retention projections 30a, 30b in the new slots.

The door 30 may be closed by reversing the procedure just described. The door lower end is moved to remove the retention projections 30a, 30b from the second retention slots 24b, 32b. Then the door 30 and the door supports 26, 28 are rotated in reverse directions, toward the first retention slots 24a, 32a, where the retention projections 30a, 30b may be inserted into the first retention slots to secure the door 30 in the closed orientation as previously described.

Figure 5:
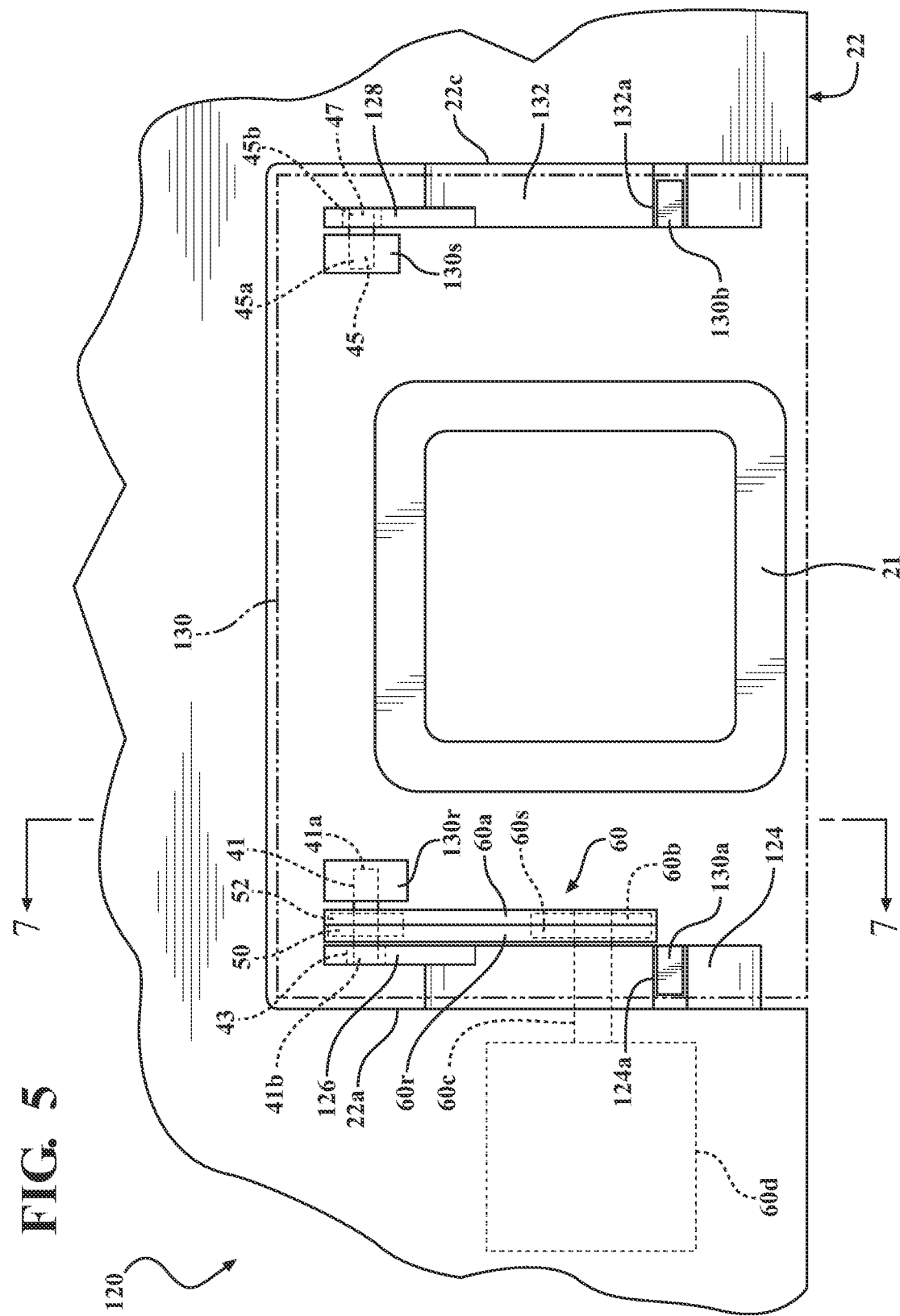
FIG. 5 is a schematic end view of a cover system for covering a vehicle tow hitch connector in accordance with another embodiment described herein and showing the door of the cover system in the closed orientation.
Figure 6:
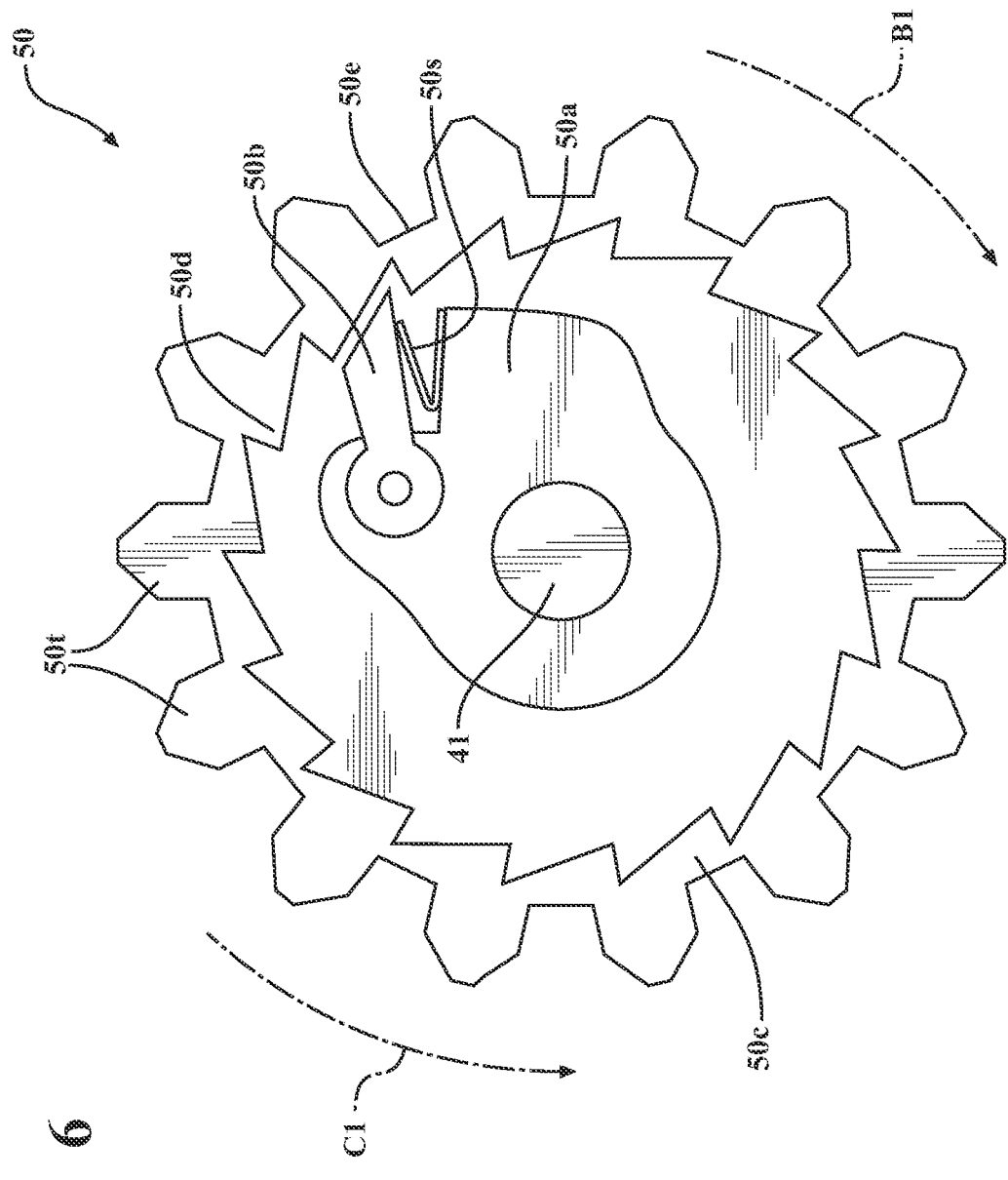
FIG. 6 is a schematic example of a type of freewheel gear which may be employed to control opening and closing of the door in the cover system embodiment of FIG. 5.
Figure 7:
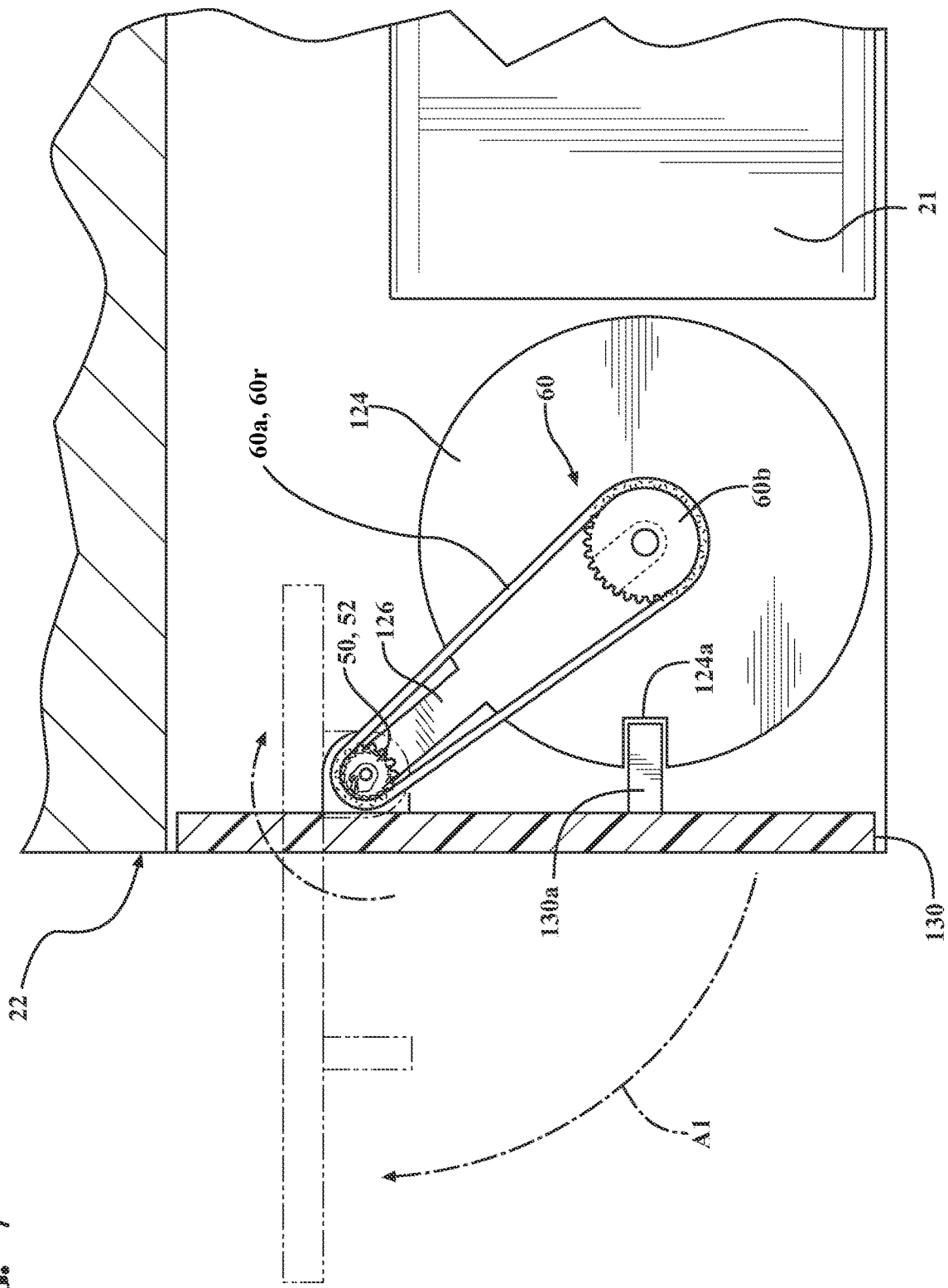
FIG. 7 is a schematic cross-sectional view of a portion of the cover system shown in FIG. 5, illustrating operation of the system to move the door from the open to the closed orientation.

FIGS. 5-7 show a second, motorized embodiment of a cover system (generally designated 120) for covering the vehicle tow hitch connector 21. The door 130 may be opened by operating a button or switch (not shown) located in the occupant compartment, close to the bumper fascia 22, or remotely from a suitably configured user device (e.g., cell phone).

In one or more arrangements, the cover system 120 may include a first retention member 124 including a first retention slot 124a, and a second retention member 132 including a first retention slot 131a. In the embodiment shown, the first retention member 124 is attached to the first sidewall 22a of the fascia cavity 22d, and the second retention member 132 is attached to the second sidewall 22c of the fascia cavity 22d in a manner similar to the embodiment previously described with respect to FIGS. 1A-4.

A first door support 126 may be attached to (or integrally formed with) the first retention member 124, for example, by molding. A second door support 128 may be attached to (or integrally formed with) the second retention member 132. In addition, as seen in the drawings, the first door support 126 may extend from an outer edge of the first retention member 124, and the second door support 128 may extend from an outer edge of the second retention member 132.

A first end 41a of a first mounting pin 41 may be inserted into a first door boss 130r in an interference fit. An opposite end 41b of the first mounting pin 41 may secured in a bearing 43 mounted in door support 126 and structured to enable rotation of the pin 41 and door 30 with respect to the first door support 126. Similarly, a first end 45a of a second mounting pin 45 may be inserted into a second door boss 130s in an interference fit. An opposite end 45b of the second mounting pin 45 may secured in a bearing 47 mounted in door support 128 and structured to enable rotation of the pin 45 and door 30 with respect to the second door support 128.

A pair of oppositely facing freewheel gears 50, 52 may be rotatably coupled to the first door support 126 by mounting the gears in interference fits on the first mounting pin 41. An example of such a gear is shown in FIG. 6. However, any other gear or mechanism structured to perform the functions of gears 50, 52 as described herein may be used in place of gears 50, 52. In the example shown, a gear 50 may include a hub 50a, a pawl 50b rotatably attached to the hub, and a toothed wheel 50c rotatably attached to the hub 50a. The wheel 50c may have internal teeth 50d extending in a direction toward the hub 50a, and external gear teeth 50t formed along an outer 50e edge thereof. The external teeth 50t may be structured to enable the toothed wheel 50c to be rotated by a chain drive (generally designated 60, FIGS. 5 and 7) engaging the teeth 50t.

In the embodiment shown, the pawl 50b is structured to rotate a limited amount in a direction B1 against a force exerted by spring 50s responsive to rotation of the wheel 50c, and is structured so that rotation of the pawl is prevented in a direction C1 opposite direction B1 with respect to the hub 50a. The pawl 50b and internal teeth 50d are structured so that the pawl 50b engages the internal teeth 50d when the wheel 50c is rotated in direction C1 with respect to the hub 50a, thereby causing the hub 50a to rotate in direction C1. Also, the pawl 50b and internal teeth 50d are structured so that the pawl 50b rotates and slides over the internal teeth 50d when the wheel 50c is rotated in direction B1 with respect to the hub 50a, causing the gear to "slip" (i.e., rotation of the wheel 50c in the second direction B1 with respect to the hub 50a produces no corresponding rotation of the hub 50a).

Figure 6A:
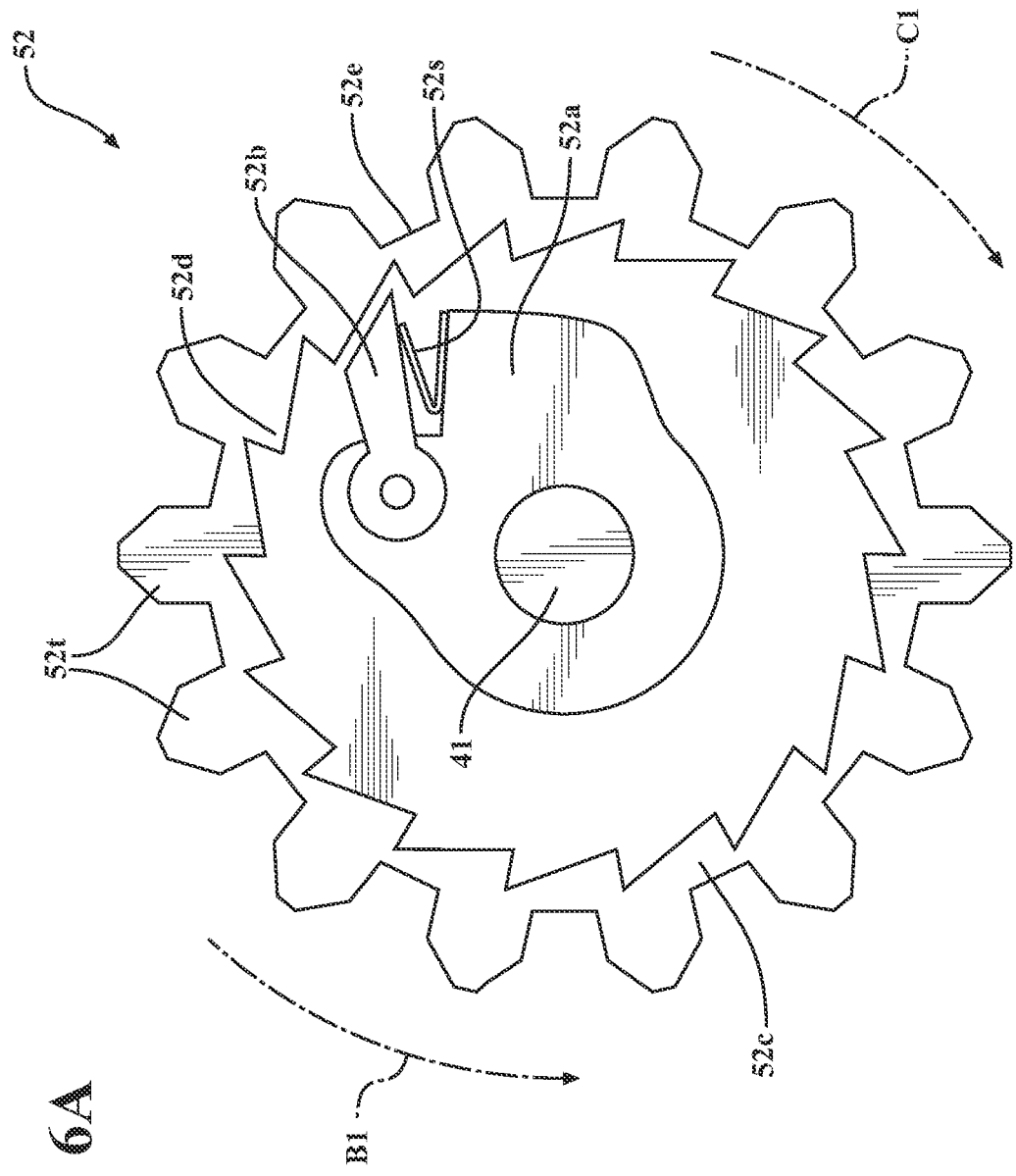
FIG. 6A is a schematic example of a freewheel gear structured similarly to the gear shown in FIG. 6, but mounted with respect to the gear of FIG. 6 so as to face in a direction opposite that in which the gear of FIG. 6 faces.

Referring to FIG. 6A, gear 52 may be structured in the same way as gear 50, but positioned to face in a direction opposite that of gear 50. That is, gear 52 may include a hub 52a, a pawl 52b rotatably attached to the hub, and a toothed wheel 52c rotatably attached to the hub 52a. The wheel 52c may have internal teeth 52d extending in a direction toward the hub 52a, and external gear teeth 52t formed along an outer 52e edge thereof. The external teeth 52t may be structured to enable the toothed wheel 50c to be rotated by the chain drive engaging the teeth 52t. FIG. 6A shows the gear 52 as it would be mounted with respect to gear 50, facing in an opposite direction from gear 50.

As used herein, the term "oppositely facing" is understood to mean that the freewheel gears 50, 52 are mounted such that rotation of a first toothed wheel (such as wheel 50c) in a first rotational direction (such as direction C1) produces rotation of the door in the first rotational direction, while rotation of the first toothed wheel in a second rotational direction (such as direction B1) opposite the first rotational direction causes the first gear to "slip", thereby producing no rotation of the door. In addition, the second gear (such as gear 52) is mounted such that rotation of a toothed wheel of the second gear 52 in the first rotational direction C1 causes the second gear to "slip", thereby producing no rotation of the door, while rotation of the toothed wheel of the second gear 52 in the second rotational direction B1 produces rotation of the door in the second rotational direction. In the embodiment shown, the oppositely facing freewheel gears 50, 52 may be press-fit onto the mounting pin 41 between the boss 130r and the first door support 126. This enables rotation of the gears 50, 52 to control rotation of the door 130, as described herein. For example, the gears 50 and 52 may be mounted on the mounting pin 41 back-to-back adjacent each other.

A freewheel gear rotation mechanism may be provided to rotate both freewheel gears 50, 52 simultaneously. In the embodiment shown in FIGS. 5-7, the freewheel gear rotation mechanism comprises a chain drive mechanism 60. However, any other suitable type of gear rotation mechanism may be used.

Referring to FIGS. 5-7, a first chain 60r may extend between a first freewheel gear 50 and a first drive gear 60s rotatably coupled to the first retention member 124 or to another static member of the cover system. A second chain 60a may extend between a second freewheel gear 52 and a second drive gear 60b rotatably coupled to the first retention member 124 or to another static member of the cover system. The chains 60a, 60r may be wrapped around respective drive gears 60b, 60s and respective ones of the freewheel gears 52, 50 so as to enable rotation of the drive gears 60b, 60s to produce a corresponding rotation of both of the freewheel gears 52, 50 simultaneously. The first and second drive gears 60s, 60b may be configured to rotate simultaneously, in conjunction with each other and at the same rotational speed in the same direction. To this end, the drive gears 60s. 60b may be mounted on a shaft 60c extending through the fascia first sidewall 22a to a motor 60d or other mechanism structured to control rotation of the shaft 60c responsive to control signals from a user. Alternatively, the motor 60d may control shaft rotation in cooperation with one or more limit switches (not shown) set to actuate the motor 60d at desired limits of rotational travel of the door 130.

FIG. 5 shows the door 130 (in phantom) in a closed orientation as described previously with respect to FIGS. 1A and 1B. FIG. 7 shows a progression of the door 130 from a closed orientation (solid lines) to an open orientation (phantom lines) as the door is opened.

In operation, motor 60d is actuated to rotate shaft 60c in a first rotational direction selected to open the door. Rotation of the shaft in the first rotational direction may cause the chains 60a, 60r to rotate the wheels 52c, 50c of both freewheel gears 52, 50 simultaneously in the first rotational direction. Since the gears 50, 52 are oppositely facing, the rotation of the wheel of one of the freewheel gears (for example, wheel 50c of first gear 50) in the first rotational direction may cause the pawl 50b of the gear to engage the gear internal teeth 50d, thereby producing a corresponding rotation of the first gear hub 50a in the first rotational direction. This, in turn, produces a rotation of the door 130 attached to the first gear hub 50a in the first rotational direction. In addition, when the wheel 52c of the oppositely facing second freewheel gear 52 is rotated in the first rotational direction, the second freewheel gear slips. Rotation of gears 50, 52 may proceed until the door is open.

To close the door 130, the chains 60a, 60r are operated to rotate the wheels 52c, 50c of the gears 52, 50 in a second rotational direction opposite the first rotational direction. During rotation in the second direction, the first gear 50 slips while the pawl 52b of the second gear 52 engages the associated gear internal teeth, thereby producing a corresponding rotation of the hub of the second gear 52 in the second rotational direction. This, in turn, produces a rotation of the door 130 attached to the second gear hub 52a in the second rotational direction. Rotation of the second gear wheel 52 may proceed until the door is closed.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-8, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A cover system for covering a vehicle tow hitch connector, the system comprising:
   a first retention member including a first retention slot and a second retention slot angularly spaced apart from the first retention slot;
   a first door support coupled to the first retention member;
   a second door support positioned opposite the first door support; and
   a door rotatably coupled to the first and second door supports, the door including a first retention projection structured to be received in the first retention slot to position the door in a closed orientation.

2. The cover system of claim 1 further comprising a second retention member including a first retention slot.

3. The cover system of claim 2 wherein the door includes a second retention projection structured to be received in the second retention member first retention slot when the door is in the closed orientation.

4. The cover system of claim 2 wherein the second door support is rotatably coupled to the second retention member.

5. The cover system of claim 2 wherein the second retention member further includes a second retention slot angularly spaced apart from the first retention slot.

6. The cover system of claim 1 wherein the first door support is rotatably coupled to the first retention member.

7. The cover system of claim 1 further comprising a first spring member operably coupled to the door and to the first door support so as to bias the first retention projection in a direction toward the first retention member first retention slot.

8. The cover system of claim 1 further comprising a bumper fascia defining a cavity structured for receiving therein at least a portion of a vehicle tow hitch connector when the connector and the fascia are mounted on a vehicle, and wherein the door is structured to cover at least a portion of an open side of the fascia cavity when the door is in the closed orientation.

9. The cover system of claim 8 wherein the first retention member, the first door support, and the second door support are mounted to the bumper fascia inside the cavity.

10. A cover system for covering a vehicle tow hitch connector, the system comprising:
    a first retention member including a first retention slot;
    a first door support coupled to the first retention member;

a second door support positioned opposite the first door support;

a door rotatably coupled to the first and second door supports, the door including a first retention projection structured to be received in the first retention slot to position the door in a closed orientation; and a pair of oppositely facing freewheel gears rotatably coupled to the first door support and coupled to the door such that rotation of either one of the freewheel gears produces a rotation of the door.

11. The cover system claim 10 further comprising a freewheel gear rotation mechanism structured to rotate both freewheel gears simultaneously.

12. The cover system claim 11 wherein the freewheel gear rotation mechanism comprises a chain drive mechanism.

13. The cover system of claim 10 further comprising a bumper fascia defining a cavity structured for receiving therein at least a portion of a vehicle tow hitch connector when the connector and the fascia are mounted on a vehicle, and wherein the door is structured to cover at least a portion of an open side of the fascia cavity when the door is in the closed orientation.

14. The cover system of claim 13 wherein the first retention member, the first door support, and the second door support are mounted to the bumper fascia inside the cavity.

* * * * *